May 12, 1959 R. M. WALKER 2,886,798

INFORMATION STORAGE SYSTEMS

Filed April 3, 1956 3 Sheets-Sheet 1

INVENTOR.
ROBERT M. WALKER
BY
Van Deventer & Shively
ATTORNEYS

INVENTOR.
ROBERT M. WALKER
BY
Van Deventer & Shively
ATTORNEYS.

INVENTOR.
ROBERT M. WALKER
BY
Van Deventer & Shively
ATTORNEYS

United States Patent Office 2,886,798

Patented May 12, 1959

2,886,798

INFORMATION STORAGE SYSTEMS

Robert M. Walker, Closter, N.J., assignor to International Business Machines Corporation, a corporation of New York Application April 3, 1956, Serial No. 575,774

10 Claims. (Cl. 340—173)

The present invention pertains to improvements in information storage systems.

An object of the invention is to provide an improved storage system particularly adapted to use of spin echo apparatus, though not limited thereto.

A further object is to provide a spin echo system adapted to store and hold information available for any desired length of time.

A further object is to provide apparatus of the above nature including a plurality of storage devices and means to transfer stored information cyclically from each device to the next throughout the system in a normally closed loop.

A further object is to provide a system of the above nature wherein the transfer means includes common reshaping and retiming means by which the stored information is accurately preserved in its initial condition throughout any required number of cyclic transfers.

Another object is to provide a system of the type set forth including means for selectively reading out the whole or any desired part of the stored information without removing the latter from the store.

A further object is to provide a system of the above type including means for selectively altering, removing or replacing any desired portion or the whole of the stored information.

Other objects and advantages of the invention will become evident during the course of the following description in conjunction with the accompanying drawings, in which Figures 1 and 2 illustrate a typical spin echo storage device suitable for use in the cyclic system;

Figure 1:
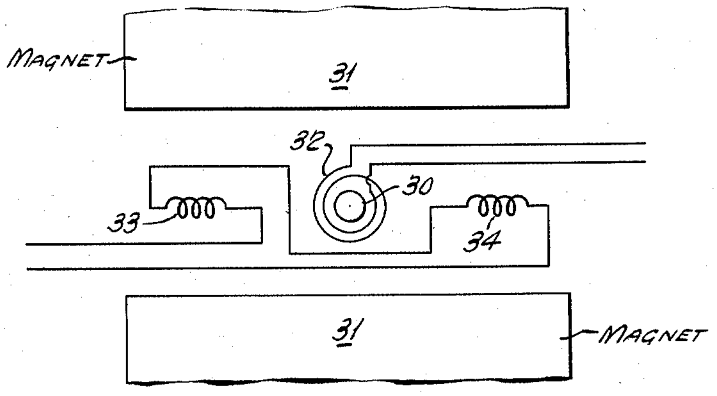

The phenomenon of nuclear induction per se has been set forth in U.S. Patent 2,561,489 to F. Bloch et al., as well as in sundry well-known scientific publications by Bloch and by Purcell. The extension of the effect to produce spin echoes, the work of E. L. Hahn, was described by the latter scientist in an article entitled "Spin Echoes," published in Physical Review, November 15, 1950, and various forms of storage techniques and apparatus are embodied in U.S. Patents 2,700,147, 2,705,790, 2,714,714 and 2,718,629. As the above scientific publications are readily available in the public domain, repetition herein of the entire complex mathematical analysis contained in them is unnecessary, it being appropriate instead to set forth only such description of spin echo phenomena per se as is necessary to make clear how they may be utilized in the present invention.

Nuclear induction, while in itself a magnetic effect, is based on a combination of magnetic and mechanical properties existing in the atomic nuclei of chemical substances, good examples being the protons or hydrogen nuclei in water and various hydrocarbons. The pertinent mechanical property of such a nucleus is that of spin about its own axis of symmetry, and since the nucleus has mass it possesses angular momentum of spin and thus comprises a gyroscope, infinitesimal, but nevertheless having the normal mechanical gyroscopic properties. In addition, the nucleus possesses a magnetic moment directed along its gyroscopic axis. For a given chemical substance, a fixed ratio exists between the magnetic moment of each nucleus and its angular momentum of spin, this fixed relationship being termed the gyromagnetic ratio.

A small sample of chemical substance, such as water as previously noted, obviously contains a vast number of such gyroscopic nuclei. If the sample is subjected to a strong unidirectional magnetic field these spinning nuclei align themselves with their magnetic axes parallel to the field, after the manner of a large gyroscope aligned in the earth's gravitational field. In the aggregate, whether the various nuclear magnetic moments are aligned with or against the field is determined largely by chance, but while a large number aligned in opposite directions cancel each other, there always exists a preponderance in one direction which for analysis may be taken as with the field. Thus the sample, affected by the magnetic field, acquires a net magnetic moment $M_0$ which represents the vector sum of the individual magnetic moments of all the spinning nuclei concerned.

So long as the sample remains undisturbed in the field, the gyroscopic nuclei remain in parallel alignment therewith as noted. If, however, a force is applied which tips them out of alignment with the main field, upon release of the tipping force the spinning nuclei, urged again toward realignment by the force of the field, rotate or precess about the field direction in the familiar gyroscopic manner. The radian frequency of precession of each nucleus is termed its Larmor frequency, and is equal to the product of the main field strength affecting that particular nucleus and the latter's gyromagnetic ratio. Since as previously mentioned, the gyromagnetic ratio for all nuclei of a particular type is a constant (for example $2.68 \times 10^4$ for protons or hydrogen nuclei in water) it is evident that the Larmor frequency of each such precessing nucleus is directly proportional to the field strength affecting that particular nucleus. It will further be evident that if the main field strenght $H_0$ is of differing values in different parts of the sample, nuclei of these various parts will exhibit magnetic moments precessing at differing Larmor frequencies. Under these conditions, the individual magnetic moments of any group originally aligned as $M_0$ or any subdivision thereof will no longer remain in alignment but will fan out or precess apart at rates dependent on the differences in their individual Larmor frequencies.

Spin echo informational storage technique is based on the above described characteristic of differential nuclear precession in an inhomogeneous field. For clarity in describing the manner in which multiple storage units may be coordinated in the present invention, it is first appropriate to describe briefly a typical example of a single spin-echo unit suitable for use therein, such apparatus being illustrated in Figures 1 and 2.

Referring first to Figure 1, the numeral 30 designates a sample of chemical substance, for example glycerine, in which information is to be stored. The sample 30 is disposed between the pole faces of a magnet 31, preferably of the permanent horn type, but which of course if desired may be the electro-magnetic equivalent. The main magnetic field $H_0$ exists in the vertical direction, while a radio-frequency coil 32 is arranged to supply a field with its axis into or out of the paper of the diagram, the R.F. field thus being perpendicular to the main field. A pair of direct current coils 33 and 34, arranged as shown diagrammatically with respect to the magnet 31 and R.F. coil 32, may be provided to regulate the inhomogeneity of the main field $H_0$, as explained at length in the previously mentioned Patent No. 2,718,629.

Figure 2:
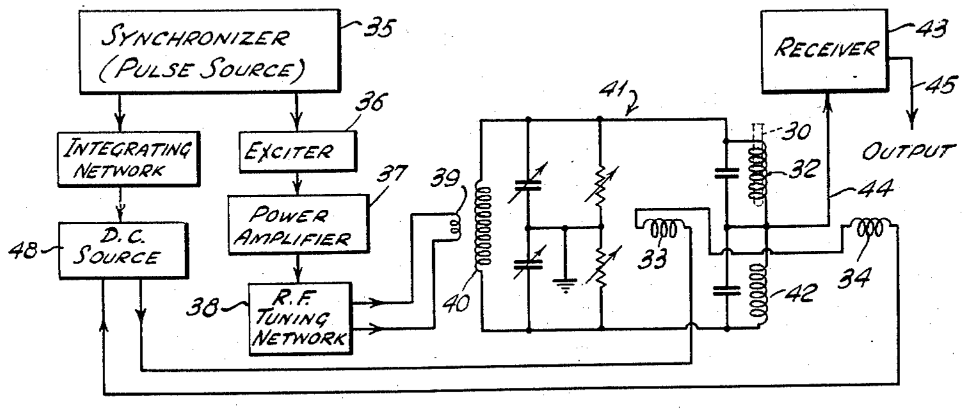

Figure 2 illustrates by semi-block diagram a typical electrical arrangement by which informational impulses may be stored in and echoes thereof recovered from the sample 30. Inasmuch as the internal structures and modes of operation of the labelled block components are in general well known in the electronic art, description thereof will appropriately be limited to that necessary to explain the manner in which they play their parts in carrying out the present invention.

A synchronizer and pulse generator 35 provides information input pulses, recollection pulses and other control pulses required by the system. An exciter unit 36, controllable by the pulse source 35 and comprising an oscillator and a plurality of frequency doubling stages, serves as a driving unit for the R.F. power amplifier 37. In the production of an information entry pulse, a recollection pulse or a pre-pulse as hereinafter described, the source 35 activates the exciter-amplifier combination to produce the desired output signal therefrom. This output is routed via a tuning network 38 to a coil 39 which is inductively coupled to a second coil 40 adapted to supply energy to a bridge circuit network 41. One leg of the bridge circuit comprises the previously described R.F. coil 32, Fig. 1, while an identical second R.F. coil 42 forms the second or balancing leg. A signal amplifier or receiver 43 has its input conductor 44 connected to the network 41 between the coils 32 and 42. The output 45 of the amplifier 43 is adapted to be connected into the common cyclic storage circuit of the present invention as hereinafter explained at length.

The sample 30 is contained within the R.F. coil 32 as indicated. From the balanced bridge arrangement shown, it will be evident that R.F. pulses introduced via the coil 40 energize the coils 32 and 42 equally, so that while the sample 30 receives the desired input pulses, the centrally connected conductor 44 carries but little R.F. power to the amplifier 43. By this arangement, the sample 30 may be subjected to heavy R.F. power pulses without unduly affecting the signal amplifier. On the other hand, echo pulses induced by the sample 30 occur only in the coil 32, so that by unbalance of the bridge such pulses are applied to the amplifier 43 as desired.

A direct current source 48, controllable by the synchronizer 35, is adapted to supply current to the coils 33 and 34.

The general procedure in entering "bits" of information in the sample 30 is to apply torsional R.F. field pulses via the coil 32 so as to tip groups of spinning nuclei of the sample out of their common alignment in the main magnetic field and establish the differential Larmor precession previously described. For any such group, while the axial magnetic moments of the individual nuclei were originally aligned together and thus adapted to reinforce each other, the differential precession after tipping causes the individual nuclear moments to fan out or separate angularly in a rotational direction about the direction of the main field $H_0$ as an axis. So long as this condition continues, the diffusion of the component moments prevents sufficient of them from acting together so as to produce any significant inductive effect in the coil 32. However, the component moments of each group, while separating from each other as noted, retain their mutual speed relationship within the group as the latter continues to rotate as a whole at the average Larmor frequency of its constituents. Thus any information represented by a pulse which sets up the above-described orderly precessional relationship in a group of nuclear moments is effectively stored in the group so long as the relationship persists.

When it is desired to extract stored information from the sample, a relatively heavy R.F. pulse, termed the "recollection pulse," is applied via the coil 32. This has the effect of reversing the relative positions of the moments within each informational grouping while retaining the relative speeds the same as before, i.e., the "slower" moments are now ahead of the average while the "faster" moments are behind it. As a result, the component moments of each group converge to coincidence, then pass each other and re-diverge. As these moments approach and pass through coincidence they reinforce each other to induce a signal in the coil 32, this signal being the "echo" of the corresponding previously entered information pulse. The echo signal is transmitted to the "receiver" 43, where it is amplified and passed on for utilization or further storage as previously noted.

While all spin echo systems operate on the above general principle of systematic disassembly and reassembly of nuclear moments, in practice there are two detail methods of procedure, namely the "mirror echo" and the "stimulated echo" methods. The differences between the complex nuclear interactions involved in these two methods having been set forth in detail in the previously noted Patent No. 2,718,629, further such explanation herein would be redundant. Briefly stated, however, for most purposes the stimulated echo method is preferred, as it has the characteristic ability to produce the echo pulse train immediately following the recollection pulse and in the same order as that of the previously entered information pulses. Accordingly, further description of the typical utilization of spin echo technique in the present invention will be referred to the stimulated echo type of storage and extraction.

Figure 3:
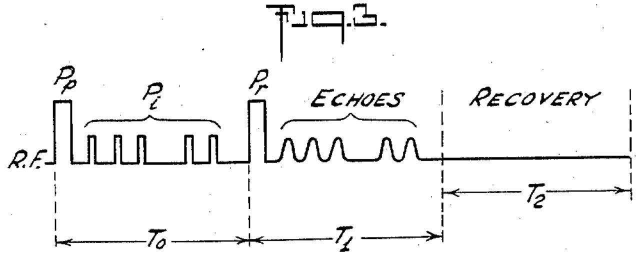
Figure 3 is a time diagram illustrating a typical single storage and spin-echo succession.

Figure 3 illustrates the sequence of voltage effects taking place across the coil 32 in a stimulated echo process. While in actual practice a typical chemical sample such as glycerine may be made to store as many as 1000 bits of information, for simplicity in illustration Fig. 3 shows the storage of only 5 bits; also, to make illustration feasible the echo pulses have been drawn 105 times larger than they would be on a scale of the ordinate which is suitable for drawing the information and control pulses.

In the stimulated echo process actual storage is preceded by a strong R.F. pulse $P_p$, termed the "pre-pulse," which in effect preconditions the nuclear moment system of the sample to assume the previously mentioned characteristic group relationships in response to entries of the weaker information pulses $P_i$. Subsequent to the information entries, when it is desired to initiate echo formation, a second relatively heavy R.F. pulse $P_r$ is applied. This "recollection pulse," which in the present case is substantially identical with the pre-pulse, converts the divergent moment relationships to convergent relationships, with the result that the echo signals appear as illustrated in Fig. 3. The echoes follow the recollection pulse $P_r$ in the same order and in the same time relationships as those by which the information pulses followed the pre-pulse $P_p$.

Figure 4:
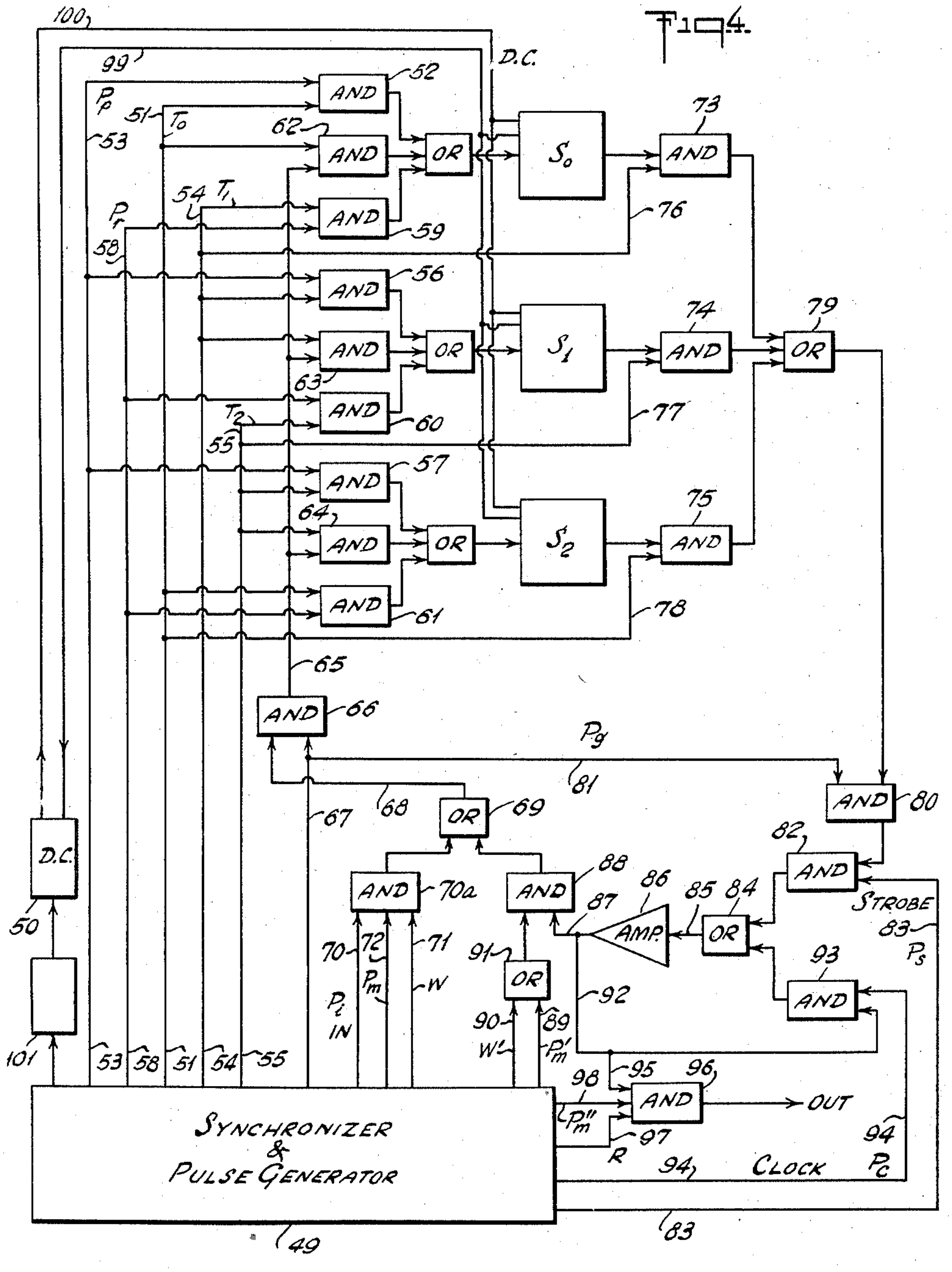
Figure 4 is a block diagram of the entire cyclic system and its appurtenances.

Thus if $T_0$ represents the time period available for information entry, an equal period $T_1$ following $T_0$ represents the time during which echo signals may be extracted, so that the total storage and extraction time for a single spin echo unit comprises $T_0+T_1$. Furthermore, following the formation of the last echo and before a new information entry can be made, sufficient "recovery" time must elapse to permit the spinning nuclei of the sample to re-align themselves in the polarizing magnetic field. In the typical case a third time period $T_2$ following $T_1$ and equal thereto has been found to afford the necessary recovery. Thus with a typical single storage unit one-third of the over-all cycle time is available for information entry, one-third may be used for access to the information, and the remainder is idle time. For many applications it will be seen to be highly advantageous to utilize the storage characteristics of spin echo technique without the above-noted time limitations, i.e., in a system adapted to retain an entered information train for as long a period as desired and in which read-out may be accomplished at any desired point of time. The present invention provides these and related advantages in the following manner:

Referring to Figure 4, the blocks $S_0$, $S_1$ and $S_2$ represent three identical storage units, each containing individually all the elements shown in Figs. 1 and 2 except the synchronizer 35 and the D.C. source 48. In the present case a single synchronizing pulse generator and control network 49 and a common D.C. source 50 are provided to serve all three storage units. As indicated by the directional arrows, the left side of the storage units is the information entry side, while information emerges through the gating shown on the right. Throughout the diagram the blocks labelled "And" represent electronic gates of the type requiring the presence of both control and input pulses to permit passage of the latter, while the "Or" blocks represent junction units or buffers through which any one or more of the input pulses may pass individually or together. As suitable gates and buffers per se are well known in the electronic art, their internal details need not be described herein.

The numeral 51 indicates a control conductor leading from the pulse generator 49 to a gate 52 adapted to pass a pre-pulse to the storage unit $S_0$, the pre-pulse $P_p$ being furnished via a conductor 53 also from the pulse generator as shown. Similarly, second and third control conductors 54 and 55 have connections to gates 56 and 57 adapted to direct pre-pulses from conductor 53 to units $S_1$ and $S_2$ respectively. Since as hereinafter described in detail, control pulses through conductors 51, 54 and 55 hold their respective gates 52, 56 and 57 open through the successive equal time periods illustrated in Fig. 5, these conductors may for clarity be termed the $T_0$, $T_1$ and $T_2$ conductors.

A common conductor 58 is adapted to furnish recollection pulses $P_r$ to the three storage units $S_0$, $S_1$ and $S_2$ via gates 59, 60 and 61 respectively. It will be noted that gate 59 is connected to the $T_1$ control conductor 54, gate 60 is controllable via $T_2$ conductor 55, and gate 61 receives its control pulse via $T_0$ conductor 51. Units $S_0$, $S_1$ and $S_2$ also have gates 62, 63 and 64 adapted to receive information pulses from a common entry conductor 65 with control connections from the $T_0$, $T_1$ and $T_2$ conductors respectively as shown. The information pulses reach the conductor 65 through a gate 66 having a control lead 67 from the synchronizer 49. These information pulses, which are fed to the gate 66 through a conductor 68 and a buffer 69, may have their origin in either of two sources. The first source, utilized in making original entries into the system, is the synchronizer 49 from which such pulses are fed to the buffer 69 via a conductor 70 and a gate 70*a* controllable jointly through leads 71 and 72. The alternative source of pulses reaching the buffer 69 lies within the storage system itself, representing the feed of pulses from each of the three storage units to the next during the cyclic retention of information as hereinafter explained.

The outputs of the storage units $S_0$, $S_1$ and $S_2$ are provided with gates 73, 74 and 75 having control branches 76, 77 and 78 from the $T_1$, $T_2$ and $T_0$ control conductors respectively. The outputs from these gates pass through a buffer 79 to a common gate 80 controllable through a lead 81 by the same pulses which control the entry gate 66. The output of the gate 80 connects to a second gate 82, hereinafter termed the strobe gate, having a control lead 83 from the synchronizer 49. The outlet from gate 82 leads through a buffer 84 to the input 85 of a low-gain amplifier 86. The amplifier's output 87 is connected to a gate 88, the latter's output leading to the previously noted buffer 69, thence to the entry gate 66. The gate 88 is controllable alternatively or jointly from the synchronizer 49 via leads 89 and 90 and a buffer 91.

From the output 87 of the amplifier 86 a feed-back conductor 92 leads to a gate 93, the latter being controllable by clock pulses derived from the synchronizer 49 through a conductor 94. The output of the gate 93 leads back via the buffer 84 to the input 85 of the amplifier. The described amplifier feed-back circuit together with the strobe gate 82 and related connections comprise the common re-timing and re-shaping means for the system, operating in a manner hereinafter explained.

For reading information out of the system, a branch 95 of the amplifier output is provided with a gate 96 which may be selectively controlled from the synchronizer 49 through leads 97 and 98.

While the system may obviously be constructed with various storage media and attendant information capacities, explanation of the operation can best be made by reference to a specific example. Such a typical embodiment, employing glycerine as the storage medium, may be taken as having a storage capacity of 63 words each providing for 16 bits of information spaced at 10 microsecond intervals, the width of each bit pulse itself occupying the last 3 microseconds of the spacing period. Allowing one additional word period for the insertion of the pre-pulse or the recollection pulse, the length of each sub-cycle time $T_0$, $T_1$ or $T_2$ thus becomes 10240 micro-seconds or 10.24 milliseconds. Thus it will be seen that the system's synchronization is based primarily on the production of the three-microsecond clock pulses at intervals of 10 microseconds or $T_c$, the word periods $T_w$ and the sub-cycle periods $T_0$, $T_1$ and $T_2$ all being exact multiples of the basic period.

Figure 5:
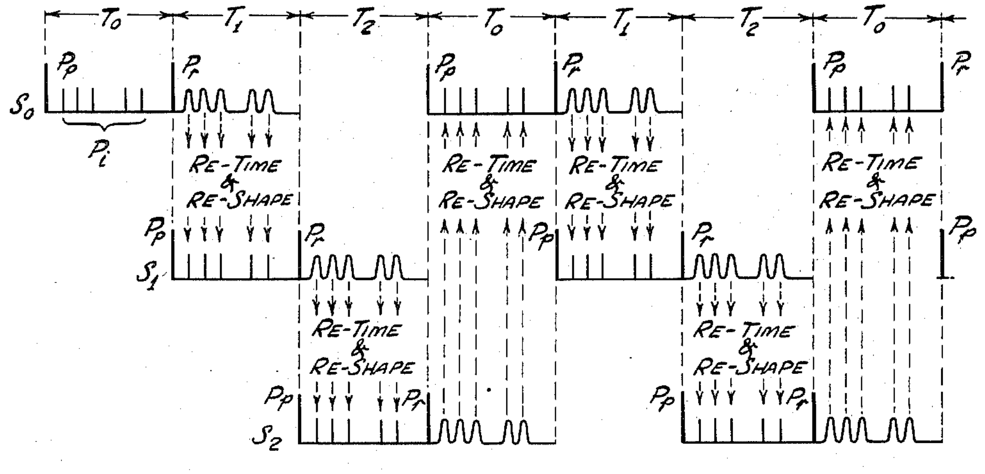
Figure 5 is a time diagram illustrating the cyclic transfer of stored information through the medium of spin echoes.
Figure 7:
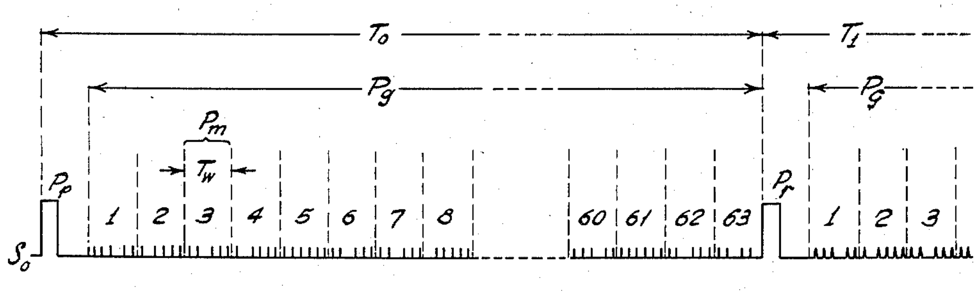
Figure 7 shows a typical sub-cycle.
Figure 6:
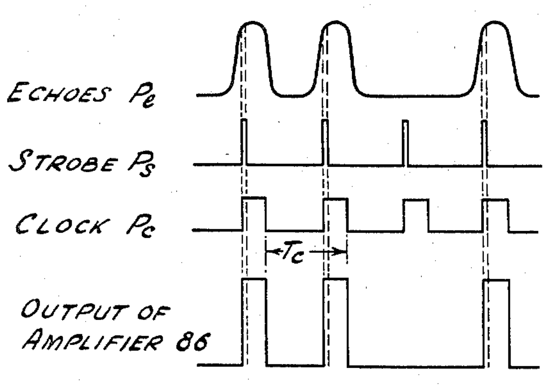
Figure 6 is a fragmental time diagram illustrating the action of the reshaping and retiming apparatus.

Other control pulses cyclically furnished by the synchronizer include the pre-pulses and recollection pulses impressed on the conductors 53 and 58 respectively, a pulse $P_g$ controlling the gates 66 and 80 via the conductor 67 and branch 81, and a strobe pulse $P_s$ controlling the gate 82. The pre-pulses and recollection pulses are impressed on their respective conductors at the beginning of each of the $T_0$, $T_1$ and $T_2$ sub-cycle periods and are routed via the respective gates to the units $S_0$, $S_1$ and $S_2$ in continuous cyclic succession as illustrated in Figure 5. The pulse $P_g$ extends throughout the last sixty-three sixty-fourths of each sub-cycle period as illustrated in Fig. 7, i.e., this pulse holds the gates 66 and 80 "open" at all times except the word-length periods during which the pre-pulses and recollection pulses are being applied. With reference to Fig. 7, it will be understood that the six divisions of each word time period $T_w$ are representative of the actual 16 $T_c$ divisions, the latter number being too large to illustrate in proper proportion. The strobe pulse $P_s$ is coincident with the first one-half microsecond of each three-microsecond bit or clock pulse $P_c$ as shown in Fig. 6.

The write-in or entry gate 70*a*, as previously mentioned, is controllable jointly via conductors 71 and 72, Fig. 4. Of these two, the conductor 71 carries an enabling potential W throughout any period during which fresh information is to be entered. With W "on," word-selector pulses $P_m$ via the second conductor 72 serve to open and hold open the gate 70*a* during any selected one or more of the sixty-three successive word periods $T_w$ into which the period $P_g$ is divided as shown in Fig. 7. During such selected periods the desired information bits are routed to the gate 70*a* via the conductor 70.

In the case of the gate 88, the control conductor 90 is adapted to furnish an enabling potential W′ which is alternative to W in time; that is, when W is "on" W′ is "off" and vice versa. Similarly, conductor 89 furnishes enabling potential $P_m'$ alternative in time to $P_m$ of the word selector conductor 72, $P_m'$ being "on" whenever $P_m$ is "off." Thus it will be noted that while for the write-in gate 70a to pass entry pulses both conductors 71 and 72 must be energized, the transfer gate 88 may be opened by either W' or $P_m'$ alone. The purpose of this relationship can best be set forth hereafter in the explanation of the system's cyclic operation. The read-out gate 96 receives a general enabling potential R via conductor 97 and word selecting pulses $P_m''$ via conductor 98, energization of both conductors being necessary to open the gate for egress of information pulses transmitted thereto by the branch 95.

Set-up control of the synchronizer 49 for information entry, extraction, alteration, etc., may be made by any suitable means such as keyboard, magnetic tape, or punch cards. As such set-up structures as well as the other details of such combinations as the synchronizer 49 are well-known in the art, further description of them per se would obviously constitute unnecessary complication herein.

When information is to be entered, assuming first for purposes of explanation that the system is initially empty of information and that the synchronizer 49 has been energized to set up the various cyclic control pulse successions previously described, the write-in gate 70a is opened jointly by W and $P_m$ and information bit pulses $P_i$ pass through gate 70a, the buffer 69 and the entry gate 66 to the conductor 65. All the storage units $S_0$, $S_1$ and $S_2$ function in precisely the same manner in their cyclic succession, so that it is actually immaterial which unit first receives the information pulses, but for clarity in connection with Figure 5 it will further be assumed that the entry takes place during the sub-cycle period $T_0$. During this period the conductor 51 is energized so that the gates 52 and 62 are opened to admit the pre-pulse $P_p$ followed by the information pulses $P_i$. These latter pulses are equal in length and individually coincident in time with the three-microsecond clock pulses $P_c$, and when received in the unit $S_0$ they affect the spinning nuclei of the unit's chemical sample 30 to set up their characteristic storage relationship therein as previously described and as indicated in Figure 5.

Immediately at the conclusion of sub-cycle $T_0$ the $T_1$ sub-cycle pulse takes over via conductor 54, throwing the recollection pulse $P_r$ into $S_0$ and also opening the latter's output gate 73. Thereupon, as the echo pulses form as also shown in Fig. 5, they are transmitted out of $S_0$, and having been re-shaped and re-timed in a manner to be described shortly hereafter, they are entered in the storage unit $S_1$ via the gate 63, the latter having been opened by the $T_1$ energization of the conductor 54 which also has provided for entry of the pre-pulse via the gate 56. In the same manner, during the sub-cycle period $T_2$ echo pulses representing the entered information emerge from $S_1$, are retimed and reshaped, and entered in the third storage unit $S_2$. Throughout the sub-cycle period $T_2$ the unit $S_0$, having no open gating, remains quiescent to allow the gyromagnetic nuclei of its storage sample to realign themselves as previously explained. At the end of $T_2$, therefore, $S_0$ is again in condition to receive the train of information pulses. Accordingly, these pulses emerge from $S_2$ in the following sub-cycle $T_0$, are again retimed and reshaped, and re-enter the unit $S_0$ to initiate the next over-all cycle. It will be evident, as indicated in Figure 5, that in the manner described the entered information combination will continue to circulate cyclically within the system for any length of time required by the use to which it is to be put, however long such time may be. With reference to Figure 5, it will be understood that to make illustration practical only a small number of entry pulses and corresponding echo pulses have been shown as representing the large number of pulses, divided into words, which comprise the actual storage capacity of the typical system.

Due to the nature of the process by which spin echoes are formed, that is by the convergence, coincidence and redivergence of the precessing nuclear moments, the echo pulses differ in contour from their originating entry pulses. Optimum results are secured by use of entry pulses of rectangular form, while the corresponding echo pulses normally assume an undulant form somewhat wider than the entry pulses. To provide the proper entry form and accurate timing in the successive re-entries taking place during the cyclic retention of information, all echo pulses emerging from the units $S_0$, $S_1$ and $S_2$ are re-shaped and re-timed as illustrated in Figure 6. As previously noted in the present example, the clock pulses $P_c$ occupy the last three microseconds of the ten-microsecond clock periods $T_c$, and the strobe pulses $P_s$ occur during the first one-half microsecond of each pulse $P_c$. Thus the feedback gate 93, Fig. 4, stands "open" throughout each three-microsecond period, while the strobe gate 82 similarly stands "open" during the first half microsecond thereof. If an echo is emerging from any of the storage units during the strobe period, the strobed portion of the echo signal supplies an input to the amplifier 86, with a resulting output through the conductor 87.

The amplifier 86 is of a type which is loaded to saturation so as to produce a constant output voltage independent of the input voltage so long as the latter does not fall below a prescribed minimum. The voltage furnished by an echo signal is above this prescribed minimum at any strobed point in the signal wave within the latter's maximum normal variations in amplitude and exact timing. Hence the amplifier output immediately assumes its constant potential, which is the potential desired to furnish the re-entry pulses $P_i$. Upon termination of the direct echo input to the amplifier via the strobe gate 82, feed-back via the conductor 92 and gate 93 keeps the amplifier energized until the end of the clock pulse $P_c$, whereupon closure of the gate 93 cuts off the feedback, terminating the output pulse from the amplifier. This process takes place each time the strobe encounters an emerging echo pulse, each corresponding output pulse from the amplifier assuming the uniform shape, timing and duration shown in Fig. 6. If no echo pulse is present at the time of a strobe pulse (as for example in the case of omission of a pulse to indicate a zero in a binary number entry), the amplifier 86 is not energized, resulting in a corresponding omission from the latter's output pulse train, also as illustrated in Fig. 6. The maximum potential of any "noise level" or unwanted interpulse effects occurring in the output of the spin echo units is below the threshold potential of the amplifier 86, so that such effects cannot cause a false output to be transmitted.

In normal retention of the originally entered information in the system the entry gate 70a, Fig. 4, is maintained closed by lack of enabling potential W in its conductor 71, while the re-entry gate 88 is held open by the enabling potential W' in the conductor 90. The pulse train from the amplifier 86 accordingly passes through the gate 88, the buffer 69 and the gate 66 to the conductor 65, whence it enters the next storage unit in the cyclic succession through the appropriate entry gate 63, 64 or 62. In the next sub-cycle the information train again emerges as echo pulses, is re-shaped and retimed, and is again re-entered in the manner described. Fig. 5 illustrates by diagram the cyclic transfer of an information bit combination within the system, and due to the operation of the common re-shaping and retiming means as described, the original pulse combination obviously retains its uniform accuracy and effectiveness without deterioration, irrespective of how long it is held in cyclic storage.

To read out stored information the R enabling conductor 97 of the gate 96 (Fig. 4) is energized, and the word selector conductor 98 is also energized at the appropriate period or periods in the word sequence to pick out the desired word or words. The gate 96 is accordingly opened at the appropriate time to allow the re-shaped pulses of the chosen words to pass from the amplifier output via the branch 95 and the gate 96 to whatever destination at which they are to be utilized. It will be noted that this read-out process does not interrupt the cyclic re-entry of the same information pulses via the gate 88, the read-out simply being tapped off from the amplifier output. Thus read-out does not erase the information from the store, allowing any number of selected withdrawals to be made while retaining the whole body of stored information intact if desired.

When it is desired to effect alteration or substitution in any word or words of the store, the procedure is as follows, referring to Fig. 4: The enabling conductor 71 of gate 70*a* is energized with potential W to prepare for write-in. By the previously mentioned alternative "off and on" relationship between W and W′, the conductor 90 of the transfer gate 88 is de-energized. As the gate 88 is controllable via either of conductors 90 or 89, and as the $P_m'$ energization of conductor 89 continues so long as no $P_m$ pulse is applied to the word selector conductor 72, the cyclic re-entry through gate 88 continues. However, when the new entry is to be made, the word selector pulse $P_m$ is applied to conductor 72 while 89 is de-energized, so that the gate 88 is closed while gate 70*a* is opened. Thereupon the substitute or altering entry pulses $P_1$ are fed in via conductor 70, while the bit combination previously stored in the selected word period is blocked out at the gate 88. Upon completion of the selected entry and termination of the word selector pulse $P_m$ the gate 70*a* closes, while restoration of $P_m'$ energization through the conductor 89 re-opens the gate 88 to continue cyclic circulation of the altered information train. By the means described any selected word or words may be changed without disturbing the remainder, or of course an entirely new complete entry may be made. If desired, any previously stored original information may be read out via the gate 96 at the same time that alteration is being made in the store.

From the foregoing it will be evident that the present invention provides a flexible system by which the high speed and capacity qualities of spin echo storage technique may be employed to the best advantage, with no limit as to time of storage and with no possible deterioration in accuracy or availability of the stored information. In addition to simplicity, the common re-shaping and re-timing means is of particular advantage in maintaining uniform accuracy, since it not only eliminates the effects of any characteristic differences in echo formation among the various storage units, but also renders impossible any momentary or cumulative difference irregularities which could arise if separate, individual re-timing and/or re-shaping means were to be applied to each storage unit.

To minimize noise level in the various spin echo units by preventing inter-pulse echo formation, the units may be provided with variation in the inhomogeneity of their polarizing fields $H_0$ by direct currents in the coils 33 and 34, Fig. 2, as fully set forth in the previously noted U.S. Patent Number 2,718,629. In the present cyclic system such currents may be led to the three units $S_0$, $S_1$ and $S_2$ through a pair of conductors 99 and 100 from the common D.C. source 50 under control of the synchronizer 49 via an integrating network 101, Fig. 4. However, as previously mentioned, the particular type of spin echo structure shown herein has been used for purposes of typical illustration, since it will be evident that the present invention may be carried out with any type of generally equivalent storage units.

Similarly, various alternative arrangements may be employed in the gating combination. For example, if in the particular spin echo technique to be employed the pre-pulse and recollection pulse are of identical length and amplitude they may be supplied via the same instead of separate conductors as shown, but in general it is preferred to maintain separate control of these pulses. Also, while the gate 80, Fig. 4, is necessary to prevent any possible effects of the pre-pulses or recollection pulses from reaching the re-timing and re-shaping means, the co-operative gate 66 could be eliminated for ordinary functioning conditions. Here again, however, inclusion of the gate 66 is preferred, as it makes impossible any accidental attempted write-in during the prepulse and recollection pulse periods in case of improper synchronizer set-up. In other words, while the invention has been set forth in preferred form, it is not limited to the precise structures and procedures illustrated, as various modifications may be made without departing from the scope of the appended claims.

I claim:

1. In an information storage system, in combination, a plurality of storage units each having an over-all operative time cycle including a reset period each adapted to store a train of informational bits entered therein as electrical pulses and subsequently to emit electrical pulses corresponding to said train, a synchronizer adapted to generate electrical control pulses and said informational entry electrical pulses, common pulse wave sampling and re-shaping and re-timing means, write-in means including a plurality of gating means controllable by said synchronizer to direct said informational pulse train from said synchronizer initially into any one of said units, gating means controllable by said synchronizer to direct said emitted pulses from each of said units through said common sampling and re-shaping and re-timing means and said first gating means into the next unit throughout said plurality in cyclic succession, whereby said information train may circulate within said system in a normally closed loop, and read-out means to selectively extract said information from said train.

2. The combination claimed in claim 1 including gating means controllable by said synchronizer and co-operative with said write-in means to selectively alter said train of informational bits circulating within said system.

3. In an information storage system, in combination, a plurality of spin-echo storage units each adapted to store a train of informational bits by precessional divergence association of gyromagnetic nuclei in said unit in response to electrical entry pulses applied to said unit in timed relation and subsequently to emit electrical echo pulses effected by precessional reconvergence of said gyromagnetic nuclei in respective correspondence with said entered electrical pulses, common means to re-shape and re-time said emitted echo pulses substantially to the wave-form and time relation of said entry pulses, synchronizing means to generate electrical control pulses and said electrical entry pulses, write-in means controllable by said synchronizing means to initially apply a train of said entry pulses to one of said spin-echo storage units, gating means controllable by said synchronizing means to direct said emmitted echo pulses from each of said storage units through said common re-shaping and re-timing means and part of said write-in means into the next storage unit throughout said plurality in cyclic succession, whereby said information train may circulate within said system in a normally closed loop, and read-out means to selectively extract said information from said circulating train.

4. The combination according to claim 3 including gating means controllable by said synchronizer and co-operative with said write-in means to selectively alter said train of informational bits circulating within said system.

5. The combination according to claim 3 wherein said information extracting means includes gated conducting means connected to the output portion of said common re-shaping and re-timing means.

6. A system according to claim 3 wherein said plurality includes three of said spin-echo storage units each adapted to operate in three successive equal time periods comprising an entry period, an echo producing period and a recovery period; said synchronizing means being adapted to establish said time periods and to control said common re-shaping and re-timing means.

7. A system according to claim 3 including means to selectively alter said circulating information train, said altering means including gating means cooperative with said write-in means and controllable by said synchronizing means to interrupt said circulation while said write-in means is in operation.

8. A system according to claim 3 wherein said common re-shaping and re-timing means includes an amplifier, common gated means controllable by said synchronizing means to conduct a timed fraction of each of said echo pulses to the input of said amplifier to establish an output voltage therefrom, and means forming a feed-back circuit for said amplifier to maintain said output voltage upon termination of said timed fractional input pulse thereto, said feedback circuit including gating means controllable by said synchronizing means to terminate said feed-back after a pre-determined interval.

9. A system according to claim 3 wherein said spin echo storage units are adapted to receive said entry pulse train in pre-determined respective sub-cyclic entry time periods; said synchronizing means being adapted to establish said sub-cyclic periods and to control said common re-shaping and re-timing means; and including means controllable by said synchronizing means to apply echo-initiating recollection pulses to said units at the terminations of said respective sub-cyclic entry periods, and means controllable by said synchronizing means to block off said common re-shaping and re-timing means from the outputs of said storage units during said application of said recollection pulses to said units.

10. A system according to claim 3 wherein said spin echo storage units are adapted to receive said entry pulse train in pre-determined sub-cyclic entry time periods; said synchronizing means being adapted to establish said sub-cyclic periods and to control said common re-shaping and re-timing means; and including means controllable by said synchronizing means to apply conditioning pre-pulses to said storage units at the beginnings of said respective sub-cyclic entry periods and to apply echo-initiating recollection pulses to said units at the terminations of said entry periods, and means controllable by said synchronizing means to block off said common re-shaping and re-timing means from the outputs of said storage units during said application of said pre-pulses and recollection pulses to said units.

References Cited in the file of this patent

UNITED STATES PATENTS 2,685,067 Beveridge et al. ---------- July 27, 1954
2,770,797 Hamilton et al. ---------- Nov. 13, 1956